US012664986B2

(12) United States Patent
Kennedy et al.

(10) Patent No.: US 12,664,986 B2
(45) Date of Patent: Jun. 23, 2026

(54) INTERRUPTION RESPONSE BY AN ARTIFICIAL INTELLIGENCE CHARACTER

(71) Applicant: Disney Enterprises, Inc., Burbank, CA (US)

(72) Inventors: James R. Kennedy, Glendale, CA (US); Reshmashree Bangalore Kantharaju, Pasadena, CA (US); Maike Paetzel-Pruesmann, Zurich (CH); Ronald Cumbal, Stockholm (SE); Komath Naveen Kumar, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 190 days.

(21) Appl. No.: 18/404,399

(22) Filed: Jan. 4, 2024

(65) Prior Publication Data

US 2025/0225986 A1     Jul. 10, 2025

(51) Int. Cl.
*G06F 17/00*        (2019.01)
*G06N 3/006*        (2023.01)
(Continued)

(52) U.S. Cl.
CPC ............ *G10L 15/222* (2013.01); *G06N 3/006* (2013.01); *G06N 3/0455* (2023.01); *G10L 13/10* (2013.01); *G10L 15/1807* (2013.01)

(58) Field of Classification Search
CPC ... G10L 15/222; G10L 15/1807; G10L 13/10; G06N 3/0455; G06N 3/006
(Continued)

(56) References Cited

U.S. PATENT DOCUMENTS

2019/0286712 A1*  9/2019  Terry ...................... H04L 51/02
2020/0043469 A1   2/2020  Raux et al.
(Continued)

FOREIGN PATENT DOCUMENTS

KR    10-2023-0035157      3/2023

OTHER PUBLICATIONS

Ting-En Lin, Yuchuan Wu, Fei Huang, Luo Si, Jian Sun, Yongbin Li "Duplex Conversation: Towards Human-like Interaction in Spoken Dialogue Systems" Proceedings of the 28th ACM SIGKDD Conference on Knowledge Discovery and Data Mining 2022 10 Pgs.

(Continued)

*Primary Examiner* — Paul C McCord
(74) *Attorney, Agent, or Firm* — Farjami & Farjami LLP

(57)        ABSTRACT
A system includes a hardware processor, a memory storing software code, and a machine learning (ML) model trained to detect an interruption to a conversation. The system detects, during a conversational turn by an artificial intelligence (AI) character in interaction with a human and/or another AI character, sound produced by the human and/or the other AI character, classifies, using the ML model, the sound as an interruption or irrelevant to the interaction. When the sound is irrelevant to the interaction, the conversational turn of the AI character continues. When the sound is an interruption, the system identifies a response strategy for continuing the interaction, and executes the response strategy including at least one of: (i) retention of the conversational turn, (ii) relinquishment of the conversational turn, or (iii) a negotiation, with the human and/or the other AI character, to determine the retention or the relinquishment of the conversational turn.

20 Claims, 5 Drawing Sheets

(51) Int. Cl.
    *G06N 3/0455*     (2023.01)
    *G10L 13/10*     (2013.01)
    *G10L 15/18*     (2013.01)
    *G10L 15/22*     (2006.01)

(58) Field of Classification Search
    USPC ........................................................ 704/257
    See application file for complete search history.

(56)          References Cited

U.S. PATENT DOCUMENTS

| | | | |
|---|---|---|---|
| 2021/0029246 A1* | 1/2021 | Erhart | H04L 51/043 |
| 2021/0335365 A1* | 10/2021 | Aharoni | H04M 3/5158 |
| 2023/0009454 A1* | 1/2023 | Paciello | A63F 13/56 |
| 2024/0283759 A1* | 8/2024 | Adams | G10L 15/22 |

OTHER PUBLICATIONS

Szu-Wei Fu, Yaran Fan, Yasaman Hosseinkashi, Jayant Gupchup, Ross Cutler "Improving Meeting Inclusiveness using Speech Interruption Analysis" Proceedings of the 30th ACM International Conference on Multimedia Oct. 2022 9 Pgs.
N. Strom & S. Seneff "Intelligent Barge-In In Conversational Systems" Interspeech Oct. 16, 2000 4 Pgs.
Patrick Gebhard Tanja Schneeberger, Gregor Mehlmann, Tobias Baur, Elisabeth Andre "Designing the Impression of Social Agents' Real-time Interruption Handling" 19th ACM International Conference Jul. 2019 3 Pgs.
Gabriel Skantze "Turn-taking in Conversational Systems and Human-Robot Interaction: A Review" Computer Speech & Language vol. 67, May 2023 50 Pgs.
Jordi Adell, Antonio Bonafonte and David Escudero-Mancebo "On the generation of synthetic disfluent speech: Local prosodic modifications caused by the insertion of editing terms" Interspeech 2008, 9th Annual Conference of the International Speech Communication Association, Sep. 22-26, 2008 4 Pgs.
Nigel Crook, Debora Field, Cameron Smith, Sue Harding, Stephen Pulman, Marc Cavazza, Daniel Charlton, Roger Moore & Johan Boye "Generating context-sensitive ECA responses to user barge-in interruptions" Journal on Multimodal User Interfaces Apr. 14, 2012 16 Pgs.
Bahador Nooraei, Charles Rich and Candace L. Snider "A Real-Time Architecture for Embodied Conversational Agents: Beyond Turn-Taking" 7th International Conference on Advances in Computer-Human Interactions, Mar. 2014 8 Pgs.
Wiebe van der Hoek, Gal A. Kaminka, Yves Lesperance, Michael Luck, Sandip Sen "International Workshop on Interacting with ECAs as Virtual Characters" 9th International Conference on Autonomous Agents and Multiagent Systems May 10-14, 2010 89 Pgs.
Extended European Search Report dated Dec. 19, 2024 in European Application 24213218.1.

* cited by examiner

Figure 3:
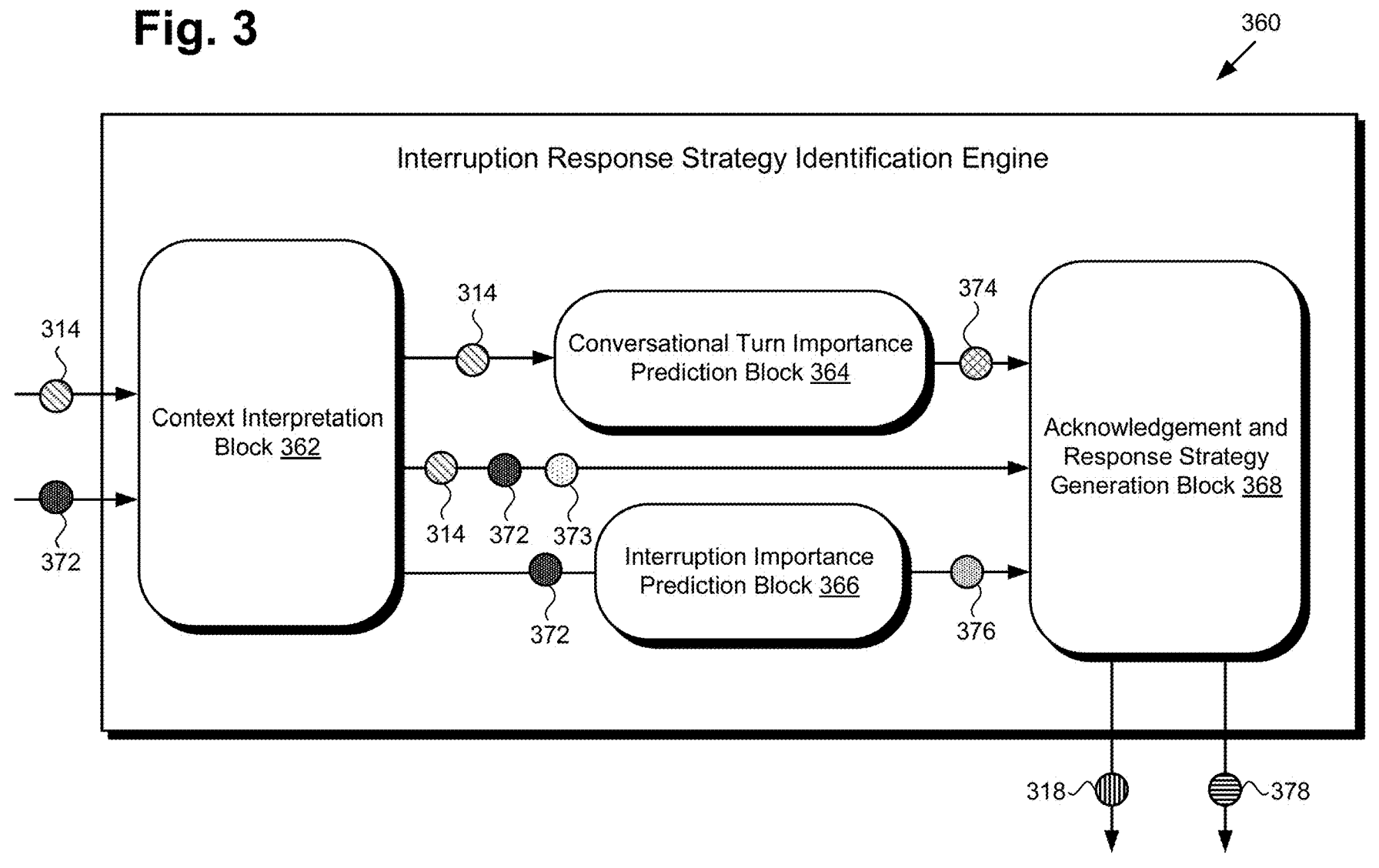

Interruption Response Strategy Identification Engine

360

Context Interpretation Block 362

Conversational Turn Importance Prediction Block 364

Interruption Importance Prediction Block 366

Acknowledgement and Response Strategy Generation Block 368

Figure 4:
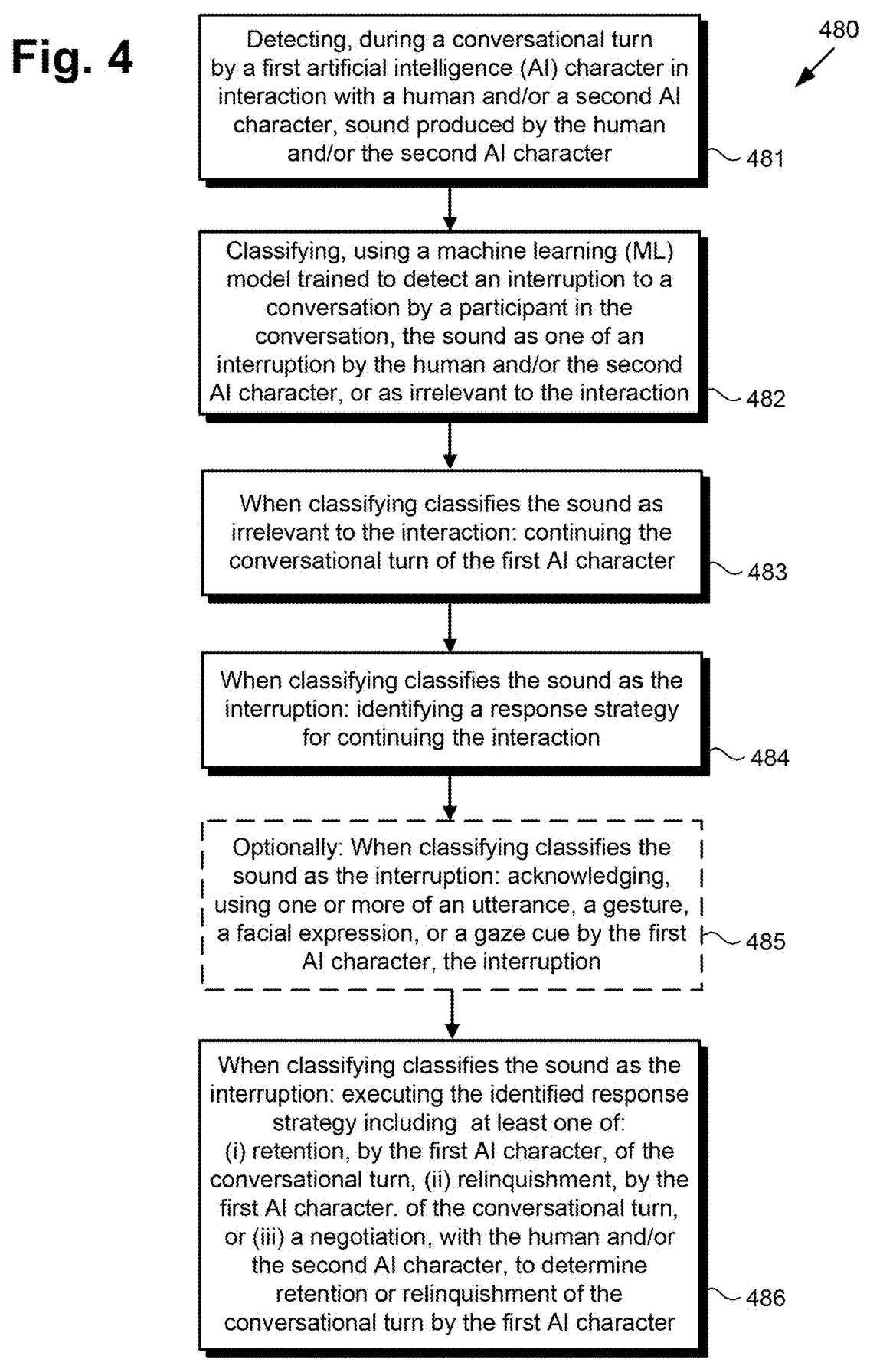

Detecting, during a conversational turn by a first artificial intelligence (AI) character in interaction with a human and/or a second AI character, sound produced by the human and/or the second AI character

481

Classifying, using a machine learning (ML) model trained to detect an interruption to a conversation by a participant in the conversation, the sound as one of an interruption by the human and/or the second AI character, or as irrelevant to the interaction

482

When classifying classifies the sound as irrelevant to the interaction: continuing the conversational turn of the first AI character

483

When classifying classifies the sound as the interruption: identifying a response strategy for continuing the interaction

484

Optionally: When classifying classifies the sound as the interruption: acknowledging, using one or more of an utterance, a gesture, a facial expression, or a gaze cue by the first AI character, the interruption

485

When classifying classifies the sound as the interruption: executing the identified response strategy including at least one of:
(i) retention, by the first AI character, of the conversational turn, (ii) relinquishment, by the first AI character. of the conversational turn, or (iii) a negotiation, with the human and/or the second AI character, to determine retention or relinquishment of the conversational turn by the first AI character

486

INTERRUPTION RESPONSE BY AN ARTIFICIAL INTELLIGENCE CHARACTER

BACKGROUND

A characteristic feature of most human interactions is spontaneity, including how individuals in conversation react to interruptions to their speech. In order for a non-human social agent, such as one embodied as an artificial intelligence (AI) interactive character, for example, to engage in conversation in a naturalistic human-like way, it is desirable to provide the non-human social agent with the ability to respond appropriately when interrupted.

Conventional solutions for providing speech for a non-human social agent may be unable to detect an interruption to that speech, or lack sophistication in their response when one is detected. For example, when the interruption goes undetected, it is simply ignored and the social agent continues its speech, i.e., "talking over" the interruption. Alternatively, a conventional response to an interruption to speech by a non-human social agent that is detected includes stopping the speech entirely when the interruption occurs. These responses may be appropriate in certain circumstances but not others. Unfortunately, both of those conversational scenarios may result in an awkward and unnatural experience for a human interacting with the social agent, and particularly in the case in which the interruption goes undetected and the social agent talks over the interruption, which may undesirably make the human feel ignored. Consequently, there is a need in the art for a solution enabling a non-human social agent to respond to interruptions to its speech in a way that is consistent with the spontaneity present in human conversational behavior.

BRIEF DESCRIPTION OF THE DRAWINGS

FIG. 3 shows a diagram of an interruption response strategy identification engine of a software code suitable for use by the system shown in FIG. 1, according to one implementation; and FIG. 4 shows a flowchart presenting an exemplary method for use by a system to provide an interruption response strategy for an AI character, according to one implementation.

DETAILED DESCRIPTION

Figure 1:
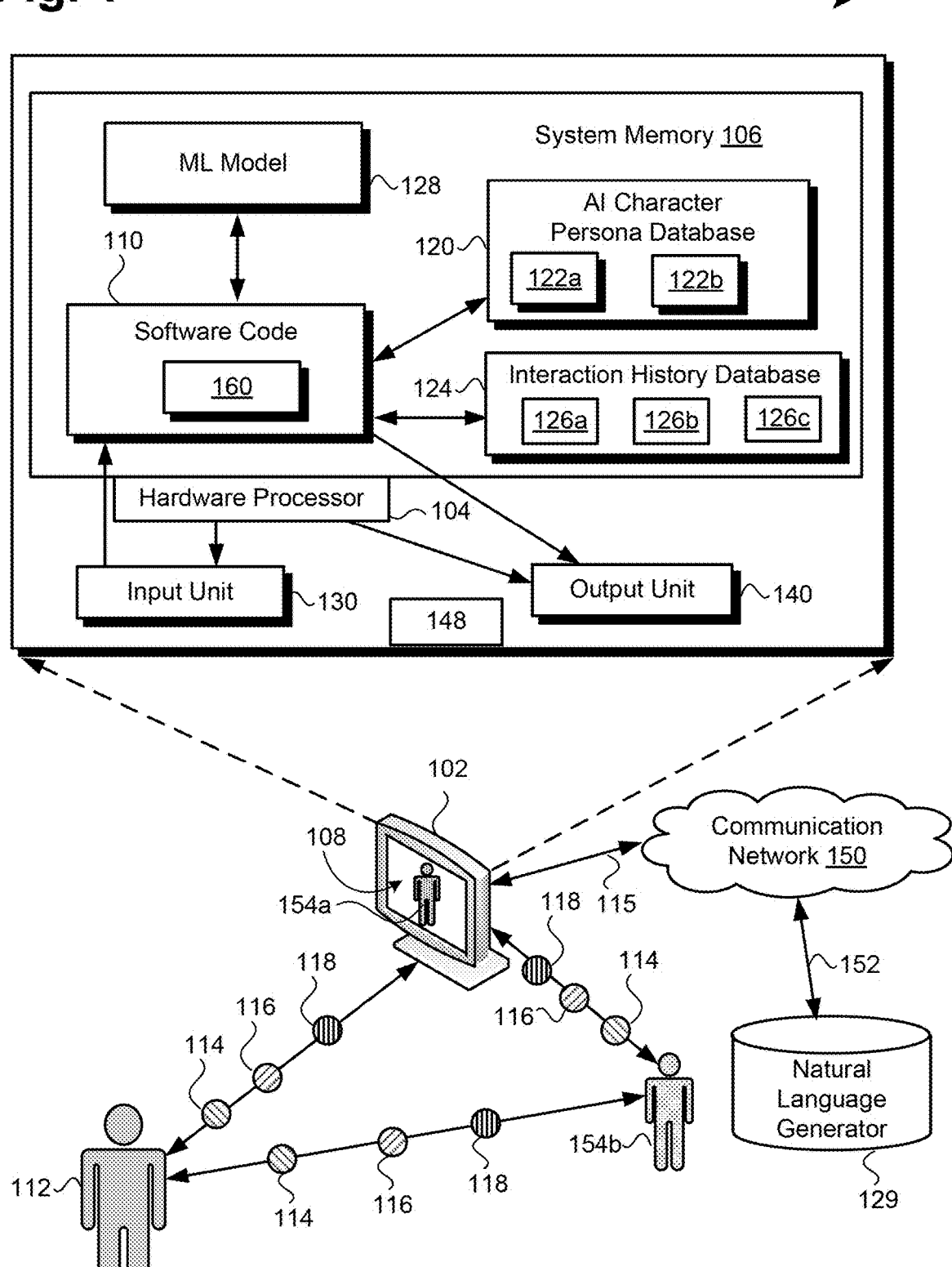
FIG. 1 shows an exemplary system for providing an interruption response strategy for an artificial intelligence (AI) character, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for providing an interruption response strategy for an artificial intelligence (AI) character that address and overcome the deficiencies in the conventional art by enabling the AI character to respond to an interruption to its speech that is consistent with human conversational behavior, consistent with the communication goals of the AI character, as well as consistent with the personality or "character persona" of the AI character. Moreover, the present solution for providing an interruption response strategy for an AI character may advantageously be implemented as automated systems and method.

As used in the present application, the terms "automation," "automated" and "automating" refer to systems and processes that do not require the participation of a human system administrator. Although in some implementations the interruption response strategies identified by the systems and methods disclosed herein may be reviewed or even modified by a human editor or system administrator, that human involvement is optional. Thus, the methods described in the present application may be performed under the control of hardware processing components of the disclosed systems.

In addition, as defined in the present application, an AI character refers to a non-human social agent that exhibits behavior and intelligence that can be perceived by a human whom interacts with the AI character as a unique individual with its own personality. AI characters may be implemented as machines or other physical devices, such as robots or toys, or may be virtual entities, such as digital characters presented by animations on a screen. AI characters may speak with their own characteristic voice (e.g., phonation, pitch, loudness, rate, dialect, accent, rhythm, inflection and the like) such that a human observer recognizes the AI character as a unique individual. AI characters may exhibit characteristics of living or historical characters, fictional characters from literature, film and the like, or simply unique individuals that exhibit patterns that are recognizable by humans as a personality.

It is noted that, as defined in the present application, the expression "real-time" refers to a time interval that enables an interaction, such as a dialogue for example, to occur without an unnatural seeming delay between an interruption, by a human speaker, to speech by an AI character and a responsive acknowledgement by the AI character. By way of example, "real-time" may refer to an AI character response time of on the order of one hundred milliseconds, or less. It is further noted that the term "non-verbal vocalization" refers to vocalizations that are not language based, such as a grunt, sigh, or laugh to name a few examples, while a "non-vocal sound" refers to a hand clap or other manually generated sound. It is also noted that, as used herein, the term "prosody" has its conventional meaning and refers to the stress, rhythm, and intonation of spoken language.

By way of overview, the present application discloses a novel and inventive solution for providing an interruption response strategy for an AI character that goes beyond conventional approaches and advances the state-of-the-art by classifying speech into interruption versus non-interruption inputs, using contextual conversation information to decide the appropriate response strategy for an interruption, and parsing the response strategy to generate appropriate interstitial dialogue, repeat parts of speech already uttered by the AI character, abandon parts of a planned speech, or other response strategy appropriate for a particular situation.

The present solution provides a system and method that reacts to an interruption signal from a human speaker or another AI character, then determines whether the interrupted AI character intends to relinquish its conversational turn or not. From these interruption signals, an interruption response strategy identification engine includes logic to modify the existing playback of the interrupted AI character's speech, optionally re-render portions of that speech, or both. It is noted that, as defined in the present application, the expression "conversational turn" refers to a sequence of speech by a participant in a dialogue that is intended to be uninterrupted while that participant is considered to be "holding the floor."

For example, when an interrupt signal is detected and classified as such during a conversational turn by an AI character, the interruption response strategy identification engine might take one of several actions. If the conversational turn is to be relinquished (i.e., the AI character is to stop speaking and allow the human speaker or another AI character to speak) then the speech stream for the AI character may be halted, with a short fade applied to prevent any audible click in the speech, for example by lowering the volume and pitch of the voice. To create a natural behavior, Natural Language Processing (NLP) may be applied to the output to identify appropriate stopping points, such as at the end of a clause, or before a stop-word. Optionally, disfluencies can be inserted to mimic the human cognitive load when trying to speak and listen simultaneously. Alternatively, or in addition, the content of the AI character's speech stream may be modified with a segue to recognize the interruption and offer a polite transition such as "Please, if you have something to say, continue" to improve conversational flow.

Alternatively, if the conversational turn is to be retained by the AI character, then the remainder of the speech by the AI character may be re-rendered starting where the interruption is currently taking place, and with additional pausing or amplitude modulation added in the first words to reflect the kind of disfluencies that a human would exhibit when being interrupted. Alternatively, or in addition, the content of the AI character's speech stream may be modified with a segue to recognize the interruption and offer a polite transition such as "Please allow me to continue and I will make sure you have a chance to talk afterward". The decision process around the modifications could utilize a heuristic rule set based on speech patterns observed in humans who often speak louder and with a higher pitch when competing for a conversational turn, or may be made using a trained machine learning (ML) model. It is noted that if segue elements are required, such as an acknowledgment of an interruption, such a segue could benefit from a specifically trained vocal style that reflects the intonation characteristics that human speakers would use in these cases.

The present interruption solution for providing an interruption response strategy for an AI character utilizes word-level time-stamping and streaming playback for executing an identified interruption response strategy, but would typically perform the identification of the interruption response strategy using shorter time shifts unrelated to words. When an interruption is detected and classified as such, the system can track exactly where in the speech by the AI character the play-head is, to then appropriately re-render with or without purposefully applied repetition. The speech streaming approach also enables low latency in the re-render, maintaining believability.

An ML model may be trained to classify a detected sound as an interruption to a conversation by a participant in the conversation. For example, the ML model may be trained to distinguish between interruption style speech and normal conversational speech or background noise. Moreover, in some implementations, the ML model trained to detect the interruption in the conversation may be applied to more than speech and could also be used to interpret facial expressions, gaze cues, or other nonverbal expressions to reflect the intent by the human speaker to interrupt the conversational turn of the AI character.

FIG. 1 shows a diagram of system 100 for providing an interruption response strategy for an AI character, according to one implementation. As shown in FIG. 1, system 100 includes computing platform 102 having hardware processor 104, input unit 130, output unit 140 including display 108, transceiver 148, and system memory 106 implemented as a non-transitory storage medium. According to the present exemplary implementation, system memory 106 stores software code 110 including interruption response strategy identification engine 160, AI character persona database 120 including AI character personas 122a and 122b, interaction history database 124 including interaction histories 126a, 126b and 126c, and ML model 128 trained to detect an interruption to a conversation by a participant in the conversation. In addition, FIG. 1 shows AI characters 154a and 154b for which an interruption response strategy may be provided using software code 110, when executed by hardware processor 104.

As further shown in FIG. 1, system 100 is implemented within a use environment including communication network 150 providing network communication links 152, and Natural Language Generator (NLG) 129, which may be or include a large-language ML model for example, communicatively coupled to system 100 via communication network 150 and network communication links 152. Also shown in FIG. 1 are human speaker 112, AI characters 154a and 154b, conversational turn 114 by one of AI characters 154a or 154b, sound 116 produced by human speaker 112 or one of AI characters 154a or 154b during conversational turn 114, and optional acknowledgement 118 of sound 116 when sound 116 is classified using ML model 128 of system 100 as an interruption to a conversation between human speaker 112 and one or both of AI characters 154a and 154b, or to a conversation between AI characters 154a and 154b exclusive of human speaker 112.

It is noted that, as defined in the present application, the expression "ML model" refers to a computational model for making predictions based on patterns learned from samples of data or "training data." Various learning algorithms can be used to map correlations between input data and output data. These correlations form the computational model that can be used to make future predictions on new input data. Such a predictive model may include one or more logistic regression models, Bayesian models, or artificial neural networks (NNs), for example. Moreover, a "deep neural network," in the context of deep learning, may refer to an NN that utilizes multiple hidden layers between input and output layers, which may allow for learning based on features not explicitly defined in raw data. As used in the present application, any feature identified as an NN refers to a deep neural network.

It is further noted that although FIG. 1 depicts AI character 154a as being instantiated as a digital character rendered on display 108, and depicts AI character 154b as a robot, those representations are provided merely by way of example. In other implementations, one or both of AI characters 154a and 154b may be instantiated by devices, such as audio speakers, displays, or figurines, or by audio speakers or displays, to name a few examples. It is also noted that AI character 154*b* corresponds in general to AI character 154*a* and may include any of the features attributed to AI character 154*a*. Moreover, although not shown in FIG. 1, like computing platform 102, in some implementations AI character 154*b* may include hardware processor 104, input unit 130, output unit 140, and system memory 106 storing software code 110 including interruption response strategy identification engine 160, AI character persona database 120, interaction history database 124, and ML model 128.

Furthermore, although FIG. 1 depicts one human speaker 112 and two AI characters 154*a* and 154*b*, that representation is merely exemplary. In other implementations, one AI character, two AI characters, or more than two AI characters may engage in a conversation with one or more human beings corresponding to human speaker 112. Alternatively, in various implementations, two or more AI characters, such as AI characters 154*a* and 154*b*, may be engaged in a conversation in which human beings do not participate, from which human beings are excluded, or in which human beings participate merely as non-speaking observers. It is also noted that although FIG. 1 depicts two character personas 122*a* and 122*b* and three interaction histories 126*a*, 126*b* and 126*c*, AI character persona database 120 will typically store tens or hundreds of character personas, while interaction history database 124 will typically store hundreds or thousands of interaction histories.

Moreover, it is noted that each of interaction histories 126*a*, 126*b* and 126*c* may be an interaction history dedicated to cumulative interactions of an AI character with the same person, such as human speaker 112, or to one or more distinct temporal sessions over which an interaction of one or more AI characters and human speaker 112 extends. Furthermore, while in some implementations an interaction history stored in interaction history database 124 may be comprehensive with respect to interactions by a human speaker with AI character 154*a*, 154*b*, or both AI character 154*a* and AI character 154*b*, in other implementations, an interaction history stored in interaction history database 124 may retain only a predetermined number of the most recent interactions by a human speaker with AI character 154*a*, 154*b*, or both AI character 154*a* and AI character 154*b*.

It is emphasized that the data describing previous interactions and retained in interaction history database 124 is preferably exclusive of personally identifiable information (PII) of human speakers with whom AI characters 154*a* and 154*b* have interacted. Thus, although AI characters 154*a* and 154*b* are typically able to distinguish an anonymous human speaker with whom a previous interaction has occurred from anonymous human speakers having no previous interaction experience with AI character 154*a* or AI character 154*b*, interaction history database 124 does not require the retention of information describing the age, gender, race, ethnicity, or any other PII of any human speaker with whom AI character 154*a* or AI character 154*b* converses or otherwise interacts.

Although the present application refers to software code 110, AI character persona database 120, interaction history database 124, and ML model 128 as being stored in system memory 106 for conceptual clarity, more generally, system memory 106 may take the form of any computer-readable non-transitory storage medium. The expression "computer-readable non-transitory storage medium," as defined in the present application, refers to any medium, excluding a carrier wave or other transitory signal that provides instructions to hardware processor 104 of computing platform 102.

Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

Moreover, in some implementations, system 100 may utilize a decentralized secure digital ledger in addition to system memory 106. Examples of such decentralized secure digital ledgers may include a blockchain, hashgraph, directed acyclic graph (DAG), and Holochain® ledger, to name a few. In use cases in which the decentralized secure digital ledger is a blockchain ledger, it may be advantageous or desirable for the decentralized secure digital ledger to utilize a consensus mechanism having a proof-of-stake (POS) protocol, rather than the more energy intensive proof-of-work (PoW) protocol.

It is further noted that although FIG. 1 depicts software code 110, AI character persona database 120, interaction history database 124, and ML model 128 as being co-located in system memory 106, that representation is also merely provided as an aid to conceptual clarity. More generally, system 100 may include one or more computing platforms 102, such as computer servers for example, which may be co-located, or may form an interactively linked but distributed system, such as a cloud based system, for instance. As a result, hardware processor 104 and system memory 106 may correspond to distributed processor and memory resources within system 100. Consequently, in some implementations, software code 110, AI character persona database 120, interaction history database 124, and ML model 128 may be stored remotely from one another on the distributed memory resources of system 100. Furthermore, although FIG. 1 depicts NLG 129 as being a remote resource accessible by system 100 using communication network 150, in some implementations, NLG 129 may be a component of system 100 and may be stored within the memory resources of system 100.

Computing platform 102 may take the form of a desktop computer, or any other suitable mobile or stationary computing system that implements data processing capabilities sufficient to provide a user interface, and implement the functionality attributed to computing platform 102 herein. For example, in other implementations, computing platform 102 may take the form of a laptop computer, tablet computer, smartphone, or an augmented reality (AR) or virtual reality (VR) device, for example, providing display 108. Display 108 may take the form of a liquid crystal display (LCD), a light-emitting diode (LED) display, an organic light-emitting diode (OLED) display, a quantum dot (QD) display, or any other suitable display screen that performs a physical transformation of signals to light.

It is also noted that although FIG. 1 shows both input unit 130 and output unit 140 as residing on computing platform 102, that representation is merely exemplary as well. In other implementations including an all-audio interface, for example, input unit 130 may be implemented as a microphone, while output unit 140 may take the form of an audio speaker. Moreover, in implementations in which AI character 154*b* takes the form of a robot or other type of machine, input unit 130 and/or output unit 140 may be integrated with AI character 154*b* rather than with computing platform 102.

In other words, in some implementations, AI character 154*b* may include one or both of input unit 130 and output unit 140.

Hardware processor 104 may include multiple hardware processing units, such as one or more central processing units, one or more graphics processing units, and one or more tensor processing units, one or more field-programmable gate arrays (FPGAs), custom hardware for machine-learning training or inferencing, and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as machine learning modeling.

Transceiver 148 may be implemented as a wireless communication unit configured for use with one or more of a variety of wireless communication protocols. For example, transceiver 148 may include a fourth generation (4G) wireless transceiver and/or a 5G wireless transceiver. In addition, or alternatively, transceiver 148 may be configured for communications using one or more of Wireless Fidelity (Wi-Fi®), Worldwide Interoperability for Microwave Access (WiMAX®), Bluetooth®, Bluetooth® low energy (BLE), ZigBee®, radio-frequency identification (RFID), near-field communication (NFC), and 60 GHz wireless communications methods.

Figure 2A:
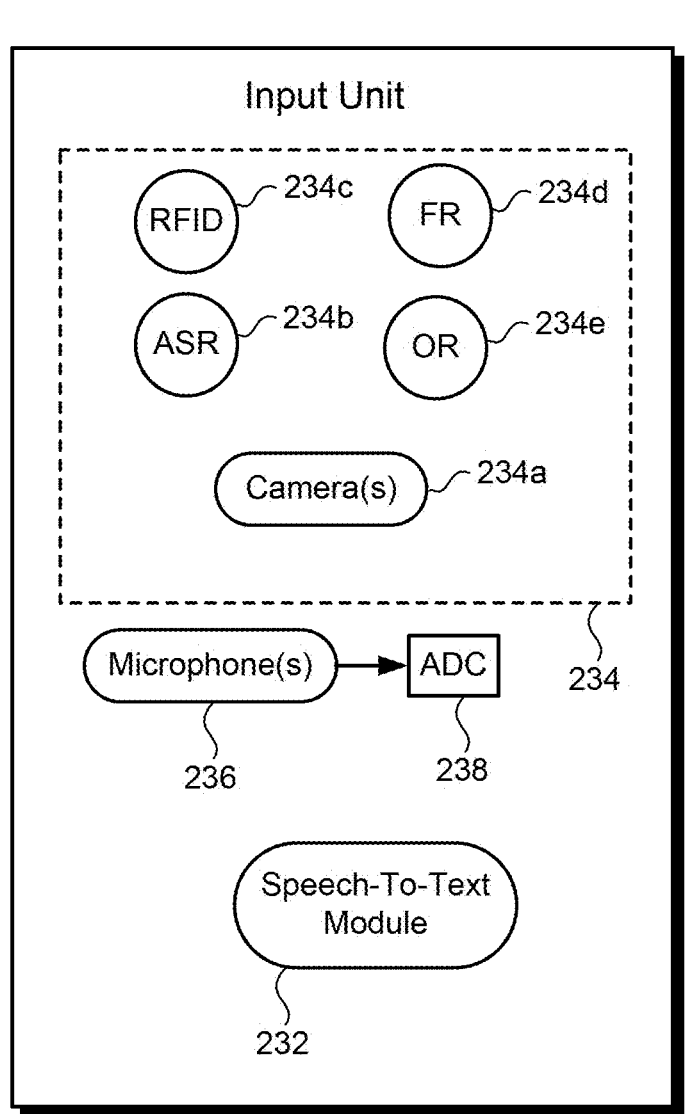
FIG. 2A shows a more detailed diagram of an input unit suitable for use as a component of the system shown in FIG. 1, according to one implementation.

FIG. 2A shows a more detailed diagram of input unit 230 suitable for use as a component of system 100, in FIG. 1, according to one implementation. As shown in FIG. 2A, input unit 230 may include speech-to-text (STT) module 232, multiple sensors 234, one or more microphones 236 (hereinafter "microphone(s) 236") and analog-to-digital converter (ADC) 238. As further shown in FIG. 2A, sensors 234 of input unit 230 may include one or more cameras 234*a* (hereinafter "camera(s) 234*a*"), automatic speech recognition (ASR) sensor 234*b*, radio-frequency identification (RFID) sensor 234*c*, facial recognition (FR) sensor 234*d* and object recognition (OR) sensor 234*e*. Input unit 230 corresponds in general to input unit 130, in FIG. 1. Thus, input unit 130 may share any of the characteristics attributed to input unit 230 by the present disclosure, and vice versa.

It is noted that the specific sensors shown to be included among sensors 234 of input unit 130/230 are merely exemplary, and in other implementations, sensors 234 of input unit 130/230 may include more, or fewer, sensors than camera(s) 234*a*, ASR sensor 234*b*, RFID sensor 234*c*, FR sensor 234*d* and OR sensor 234*e*. Moreover, in some implementations, sensors 234 may include a sensor or sensors other than one or more of camera(s) 234*a*, ASR sensor 234*b*, RFID sensor 234*c*, FR sensor 234*d* and OR sensor 234*e*. It is further noted that, when included among sensors 234 of input unit 130/230, camera(s) 234*a* may include various types of cameras, such as red-green-blue (RGB) still image and video cameras, RGB-D cameras including a depth sensor, and infrared (IR) cameras, for example.

Figure 2B:
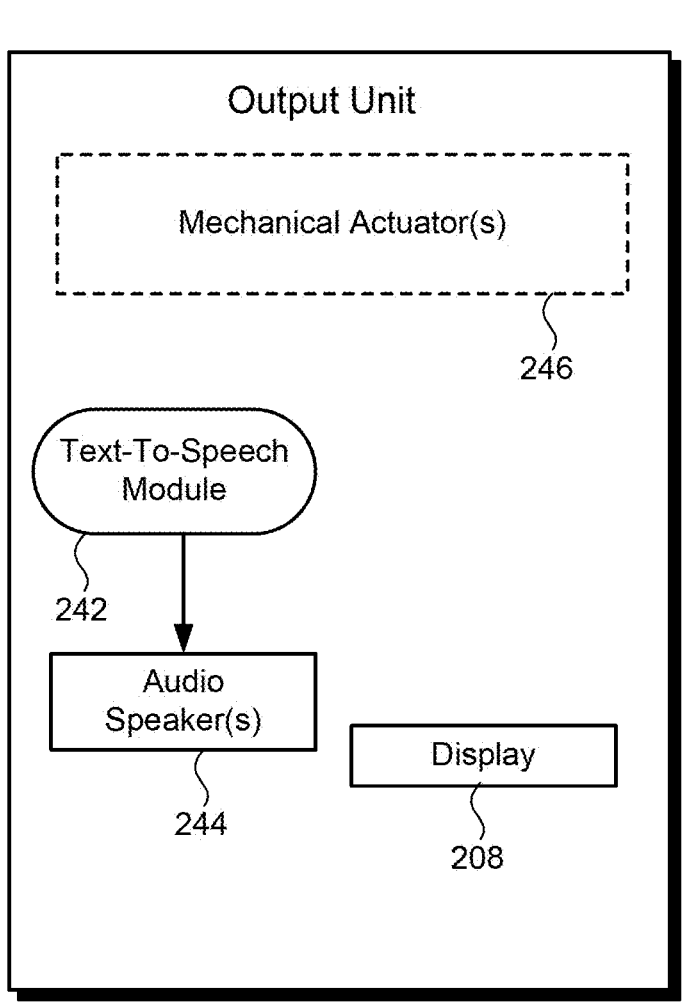
FIG. 2B shows a more detailed diagram of an output unit suitable for use as a component of the system shown in FIG. 1, according to one implementation.

FIG. 2B shows a more detailed diagram of output unit 240 suitable for use as a component of system 100, in FIG. 1, according to one implementation. As shown in FIG. 2B, output unit 240 may include one or more of TTS module 242 in combination with one or more audio speakers 244 (hereinafter "audio speaker(s) 244") and display 208. As further shown in FIG. 2B, in some implementations, output unit 240 may include one or more mechanical actuators 246 (hereinafter "mechanical actuator(s) 246"). When included as a component or components of output unit 240, mechanical actuator(s) 246 may be used to produce gestures, facial expressions, or glance cues by AI character 154*b* and/or to articulate one or more limbs or joints of AI character 154*b*. Output unit 240 and display 208 correspond respectively in general to output unit 140 and display 108, in FIG. 1. Thus, output unit 140 and display 108 may share any of the characteristics attributed to output unit 240 and display 208 by the present disclosure, and vice versa.

It is noted that the specific features shown to be included in output unit 140/240 are merely exemplary, and in other implementations, output unit 140/240 may include more, or fewer, features than TTS module 242, audio speaker(s) 244, display 208 and mechanical actuator(s) 246. Moreover, in other implementations, output unit 140/240 may include a feature or features other than one or more of TTS module 242, audio speaker(s) 244, display 208 and mechanical actuator(s) 246. As noted above, display 108/208 of output unit 140/240 may be implemented as an LCD, LED display, OLED display, a QD display, or any other suitable display screen that perform a physical transformation of signals to light.

FIG. 3 shows a diagram of interruption response strategy identification engine 360 suitable for inclusion in software code 110 of system 100 in FIG. 1, according to one implementation. As shown in FIG. 3, interruption response strategy identification engine 360 is configured to receive conversational turn 314 by an AI character and interruption 372 by a human speaker, and to generate one or both of optional acknowledgement 318 of interruption 372 and response strategy 378 to interruption 372, using context interpretation block 362, conversational turn importance prediction block 364, interruption importance prediction block 366, and acknowledgement and response strategy generation block 368. Also shown in FIG. 3 are conversation context data 373, conversational turn importance score 374 and interruption importance score 376.

It is noted that context interpretation block 362 of interruption response strategy identification engine 360 may be or include an ML model trained as a contextual classifier. It is further noted that conversational turn importance prediction block 364 and interruption importance prediction block 366 may be or include respective predictive ML models.

Interruption response strategy identification engine 360, conversational turn 314 and optional acknowledgment 318 correspond respectively in general to interruption response strategy identification engine 160, conversational turn 114 and optional acknowledgment 118, in FIG. 1. Consequently, interruption response strategy identification engine 160, conversational turn 114 and optional acknowledgment 118 may share any of the characteristics attributed to respective interruption response strategy identification engine 360, conversational turn 314 and optional acknowledgment 318 by the present application, and vice versa. That is to say, although not shown in FIG. 1, like interruption response strategy identification engine 360, interruption response strategy identification engine 160 may include features corresponding respectively to context interpretation block 362, conversational turn importance prediction block 364, interruption importance prediction block 366, and acknowledgement and response strategy generation block 368.

The functionality of software code 110 including interruption response strategy identification engine 160/360 will be further described by reference to FIG. 4. FIG. 4 shows flowchart 480 presenting an exemplary method for use by a system to provide an interruption response strategy for an AI character, according to one implementation. With respect to the method outlined in FIG. 4, it is noted that certain details and features have been left out of flowchart 480 in order not to obscure the discussion of the inventive features in the present application.

Referring to FIG. 4, with further reference to FIGS. 1 and 2A, flowchart 480 includes detecting, during conversational turn 114 by a first AI character, i.e., one of AI character 154a or 154b, in an interaction by the first AI character with human speaker 112, and/or a second AI character, i.e., the other of AI character 154a or 154b, or human speaker 112 and the second AI character, sound 116 produced by human speaker 112 and/or the second AI character (action 481). Sound 116 may include one or more of speech by human speaker 112 and/or the second AI character, a non-verbal vocalization by human speaker 112 and/or the second AI character, and a non-vocal sound produced by human speaker 112 and/or the second AI character. As noted above, a non-verbal vocalization refers to vocalizations that are not language based, such as a grunt, sigh, or laugh to name a few examples, while a non-vocal sound refers to a hand clap or other manually generated sound. Sound 116 may be detected in action 481 by software code 110, executed by hardware processor 104 of system 100, and using microphone(s) 236 of input unit 130/230.

Referring to FIGS. 1, 2A, 3 and 4 in combination, flowchart 480 further includes classifying, using ML model 128, sound 116 as one of interruption 372 by human speaker 112 and or the second AI character, or as irrelevant to the interaction by the first AI character with human speaker 112 and/or the second AI character (action 482). As noted above, ML model 128 is trained to detect an interruption to a conversation by a participant in the conversation. For example, ML model 128 may be trained to distinguish between interruption style speech and normal conversational speech. Moreover, in some implementations, ML model 128 may be applied to more than speech and can also be used to interpret gestures, facial expressions, gaze cues, or other nonverbal expressions to reflect the intent by human speaker 112 and/or the second AI character to interrupt conversational turn 114 of the first AI character. Classification of sound 116 as interruption 372 or as irrelevant to the interaction by the first AI character with human speaker 112 and/or the second AI character may be performed, in action 482, by software code 110, executed by hardware processor 104 of system 100, and using STT module 232 and ASR sensor 234b of input unit 130/230, ML model 128, and in some implementations, one or more of camera(s) 234a, FR sensor 234d and OR sensor 234e of input unit 130/230.

Referring to FIGS. 1 and 4 in combination, flowchart 480 further includes, when sound 116 is classified as irrelevant to the interaction by the first AI character with human speaker 112 and/or the second AI character, continue, using the first AI character, conversational turn 114 of the first AI character (action 483). That is to say, in some use cases in which sound 116 is classified by ML model 128 in action 482 as irrelevant to the interaction by the first AI character with human speaker 112 and/or the second AI character, conversational turn 114 proceeds as though sound 116 had not been detected in action 481. However, in other use cases, although conversational turn 114 of the first AI character is continued in action 483, its continuance may include a hesitation or disfluency. For example, where sound 116 is a cough or other reflexive or involuntary sound by human speaker 112 other than an interruption to conversational turn 114, and therefore irrelevant to the content of conversation turn 114, the first AI character may yet briefly pause, hesitate, or utter a disfluency while continuing conversational turn 114. Action 483 may be performed by software code 110, executed by hardware processor 104 of system 100.

Referring to FIGS. 1, 3 and 4 in combination, flowchart 480 further includes, when sound 116 is classified as interruption 372, identifying response strategy 378 for continuing the interaction (action 484). The identification of response strategy 378 for continuing the interaction by the first AI character with human speaker 112 and/or the second AI character when sound 116 is classified as interruption 372, in action 484, may be performed based on one or more of several characteristics of the interaction, including the context of the conversation between the first AI character and human speaker 112 and/or the second AI character, the predicted importance of conversational turn 114/314, and the predicted importance of interruption 372.

Identification of response strategy 378 for continuing the interaction by the first AI, in action 484, may be performed by software code 110, executed by hardware processor 104 of system 100, and using interruption response strategy identification engine 160/360. As noted above, in some implementations, context interpretation block 362 of interruption response strategy identification engine 160/360 may be or include an ML model trained as a contextual classifier. As further noted above conversational turn importance prediction block 364 and interruption importance prediction block 366 of interruption response strategy identification engine 160/360 may be or include respective predictive ML models.

As shown in FIG. 3, context interpretation block 362 of interruption response strategy identification engine 160/360 may be configured to receive conversational turn 114/314 and interruption 372 as inputs, to interpret the context of the conversation that includes conversational turn 114/314, and to provide conversational turn 114/314, interruption 372 and conversation context data 373 as outputs. Conversational turn importance prediction block 364 of interruption response strategy identification engine 160/360 may be configured to receive conversational turn 114/314 from context interpretation block 362, predict the importance of conversational turn 114/314 and output conversational turn importance score 374 to acknowledgement and response strategy generation block 368 of interruption response strategy identification engine 160/360.

Interruption importance prediction block 366 of interruption response strategy identification engine 160/360 may be configured to receive interruption 372 from context interpretation block 362, predict the importance of interruption 372 and output interruption importance score 376 to acknowledgement and response strategy generation block 368. In various implementations, acknowledgement and response strategy generation block 368 of interruption response strategy identification engine 160/360 may be utilized by software code 110, when executed by hardware processor 104 of system 100, to identify response strategy 378 for continuing the interaction by the first AI character with human speaker 112 and/or the second AI character using one, some, or all conversation context data 373, conversational turn importance score 374 and interruption importance score 376.

By way of example, conversational turn importance score 374 may be predicted to be high in use cases in which conversational turn includes providing safety instructions, by the first AI character, to human speaker 112. As another example, interruption importance score 376 may be predicted to be high in use cases in which interruption 372 includes an urgent or time sensitive statement such as: "I must leave now in order to be on time for my next appointment."

In some implementations, in addition to one or more of conversation context data 373, conversational turn importance score 374 and interruption importance score 376, response strategy 378 may further be identified in action 384 based on an interaction history of the first AI character with human speaker 112 and/or the second AI character, stored on interaction history database 124, a character persona of the first AI character or the second AI character stored on AI character persona database 120, or both the interaction history of first AI character with human speaker 112 and/or the second AI character, and the character persona of the first AI character and the character persona of the second AI character.

For example, where an interaction history of the first AI character with human speaker 112 and/or the second AI character indicates that human speaker 112 and/or the second AI character is an insistent interrupter, hardware processor 104 of system 100 may execute software code 110 to obtain that information from interaction history database 124 and further base identification of response strategy 378 for continuing the interaction between the first AI character and human speaker 112 and/or the second AI character on that data. Alternatively, or in addition, where the character persona of the first AI character is extroverted and assertive, or by contrast introverted and submissive, hardware processor 104 of system 100 may execute software code 110 to obtain those character traits from AI character persona database 120 and further base identification of response strategy 378 for continuing the interaction between the first AI character and human speaker 112 and/or the second AI character on that information.

Referring to FIGS. 1, 3 and 4 in combination, in some implementations, flowchart 480 may further include, when sound 116 is classified as interruption 372, acknowledging, using one or more of an utterance, a gesture, a facial expression, or a gaze cue, such as gaze avoidance, by the first AI character, interruption 372 (action 485). In some implementations optional acknowledgement 118/318 of interruption 372 may be or include speech by the first AI character expressly acknowledging interruption 372, such as the statement: "You seem to want to say something now." Alternatively, or in addition, optional acknowledgement 118/318 may include a change in the prosody of the speech by the first AI character during conversational turn 114/314, such as speeding up of speech, slowing down of speech, changes in volume or timbre of speech, or any combination thereof.

As another alternative, or in addition, in some implementations optional acknowledgement 118/318 of interruption 372 may include a disfluency in the speech by the first AI character during conversational turn 114/314, such as a stutter, mumbling, or an utterance such as "um" or "er," for example. As yet another alternative, or in addition, in some implementations optional acknowledgement 118/318 of interruption 372 may be manifested as a hesitation in the speech by the first AI character during conversational turn 114/314. Moreover, in some implementations, as noted above, optional acknowledgement 118/318 of interruption

372 may further include one or more of a gesture, a facial expression, or a gaze cue, such as gaze avoidance for example, by the first AI character during conversational turn 114/314.

It is noted that action 485 is optional, and in some implementations may be omitted from the method outlined by flowchart 480. In implementations in which optional action 485 is omitted, action 486 described below may follow directly from action 484. However, and referring to FIGS. 1, 3, and 4 with further reference to FIG. 2B, in implementations in which interruption 372 is acknowledged, action 485 may be performed by software code 110, executed by hardware processor 104 of system 100, using acknowledgement and response strategy generation block 368 of interruption response strategy identification engine 160/360, and TTS module 242 and audio speaker(s) 244 of output unit 140/240. Furthermore, in some implementations, action 485 may be performed further using mechanical actuator(s) 246 of output unit 140/240 to produce one or more of a gesture, facial expression, or gaze cue by the first AI character.

Continuing to refer to FIGS. 1, 3 and 4 in combination, flowchart 480 further includes executing response strategy 378 identified in action 485, where response strategy 378 includes at least one of: (i) retention, by the first AI character, of conversational turn 114/314, (ii) relinquishment, by the first AI character, of conversational turn 114/314, or (iii) a negotiation, by the first AI character with human speaker 112 and/or the second AI character, to determine retention or relinquishment of conversational turn 114/314 by the first AI character (action 486). Execution of response strategy 378, in action 486, may be performed by software code 110, executed by hardware processor 104 of system 100, and using acknowledgement and response strategy generation block 368 of interruption response strategy identification engine 160/360.

In use cases in which response strategy 378 identified in action 485 includes retention of conversational turn 114/314 by the first AI character, the remainder of conversational turn 114/314 by the first AI character may be re-rendered starting where interruption 372 takes place, and with additional pausing or amplitude modulation added in the first words to reflect the kind of disfluencies that a human would exhibit when being interrupted. The decision process around the modifications to the remainder of conversational turn 114/314 subsequent to interruption 372 could be made using a heuristic rule set based on speech patterns observed in humans who often speak louder and with a higher pitch, or vary the content of their speech when competing for the conversational turn, may be made dynamically using NLG 129, which, as noted above, may be or include a large-language ML model, or may be made using a combination of heuristic rule set based and dynamic NLG based contributions to the decision process.

Thus, in some implementations, when response strategy 378 includes retention, by the first AI character, of conversational turn 114/314, hardware processor 104 of system 100 may further execute software code 110 to utilize acknowledgement and response strategy generation block 368 of interruption response strategy identification engine 160/360 to modify, in response to interruption 372, one or more lines of a predetermined script of conversational turn 114/314. Alternatively, in some implementations in which response strategy 378 includes retention, by the first AI character, of conversational turn 114/314, hardware processor 104 of system 100 may further execute software code 110 to utilize acknowledgement and response strategy generation block

368 of interruption response strategy identification engine 160/360 to dynamically generate one or more lines of dialogue for completing conversational turn 114/314 by the first AI character, using NLG 129 in response to interruption 372.

If conversational turn 114/314 is to be relinquished (i.e., the first AI character is to stop speaking and allow human speaker 112 and/or the second AI character to speak) then the speech stream for the first AI character may be halted, with a short fade applied to prevent any audible click in the speech, for example by lowering the volume and pitch of the voice of the first AI character. To create a natural behavior, NLP may be used to identify appropriate stopping points, such as at the end of a clause, or before a stop-word. Optionally, disfluencies can be inserted to mimic the human cognitive load when trying to speak and listen simultaneously.

In implementations in which response strategy 378 includes a negotiation with respect to retention or relinquishment of conversational turn 114/314 by the first AI character, that negotiation may proceed using predetermined and scripted negotiation statements for use by the first AI character, or may proceed using negotiation terminology generated dynamically using NLG 129. In use cases in which negotiation occurs, that negotiation may be followed by either retention or relinquishment of conversational turn 114/314 by the first AI character, as described above.

It is noted that response strategy 378 may be executed in real-time with respect to detecting sound 116. As defined above, real-time in the present context refers to a time interval that enables an interaction such as a dialogue to occur without an unnatural seeming delay between interruption 372 by human speaker 112 and/or the second AI character and a response to interruption 372 by the first AI character. By way of example, real-time may refer to a response time of on the order of one hundred milliseconds, or less.

Referring to FIGS. 1 and 4 in combination, it is also noted that, with respect to the method outlined by flowchart 480, actions 481, 482, 483, 484 (hereinafter "actions 481-484") and action 486, or actions 481-484, optional action 485, and action 486, may be performed as an automated process from which human participation, other than the interaction by human speaker 112 with AI character 154a or 154b, may be omitted.

Thus, the present application discloses systems and methods for providing an interruption response strategy for an AI character that address and overcome the deficiencies in the conventional art. As discussed above, the novel and inventive solution for providing an interruption response strategy for an AI character disclosed by the present application advances the state-of-the-art by classifying speech into interruption versus non-interruption inputs, using contextual conversation information to decide the appropriate response strategy for an interruption, and parsing the response strategy to generate appropriate interstitial dialogue, repeat parts of speech already uttered by the AI character, or abandon parts of a planned speech.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
   a hardware processor;
   a system memory storing a software code including an interruption response strategy identification engine and an artificial intelligence (AI) character persona database having stored thereon a plurality of character personas; and
   a machine learning (ML) model trained to detect an interruption to a conversation by a participant in the conversation;
   the hardware processor configured to execute the software code to:
      detect, during a conversational turn by a first AI character in an interaction with at least one of a human or a second AI character, sound produced by the at least one of the human or the second AI character;
      classify, using the ML model, the sound as one of an interruption to the interaction by the at least one of the human or the second AI character, or as irrelevant to the interaction;
      when the sound is classified as irrelevant to the interaction:
         continue the conversational turn by the first AI character;
      when the sound is classified as the interruption to the interaction:
         identify, using the interruption response strategy identification engine, and based on a first character persona of the plurality of the character personas corresponding to the first AI character, a response strategy for continuing the interaction; and
         execute, in real-time using word-level time-stamping and streaming playback of speech of the first AI character, the identified response strategy including at least one of: (i) retention, by the first AI character, of the conversational turn, (ii) relinquishment, by the first AI character, of the conversational turn, or (iii) a negotiation, with the at least one of the human or the second AI character, to determine the retention or the relinquishment of the conversational turn by the first AI character.

2. The system of claim 1, wherein when the sound is classified as the interruption, the interruption results in a change in a prosody of speech by the first AI character during the conversational turn.

3. The system of claim 1, wherein when the sound is classified as the interruption, the interruption results in at least one of a disfluency in speech by the first AI character or a hesitation in speech by the first AI character during the conversational turn.

4. The system of claim 1, wherein when the sound is classified as the interruption, the interruption is acknowledged, by the first AI character, with at least one of an utterance, a gesture, a facial expression, or gaze avoidance.

5. The system of claim 1, wherein executing the identified response strategy includes retention, by the first AI character, of the conversational turn, and wherein the hardware processor is further configured to execute the software code to:
   modify, in response to the interruption, one or more lines of planned speech of the conversational turn.

6. The system of claim 1, further comprising:

a natural language generator (NLG);

wherein executing the identified response strategy includes retention, by the first AI character, of the conversational turn, wherein the hardware processor is further configured to execute the software code to:

dynamically generate, using the NLG in response to the interruption, one or more lines of dialogue for completing the conversational turn by the first AI character.

7. A method for use by a system including a hardware processor and a system memory, the system memory storing a software code including an interruption response strategy identification engine and an artificial intelligence (AI) character persona database having stored thereon a plurality of character personas, and a machine learning (ML) model trained to detect an interruption to a conversation by a participant in the conversation, the method comprising:

detecting, by the software code executed by the hardware processor, during a conversational turn by a first AI character in an interaction with at least one of a human or a second AI character, sound produced by the at least one of the human or the second AI character;

classifying, by the software code executed by the hardware processor and using the ML model, the sound as one of an interruption to the interaction by the at least one of the human or the second AI character, or as irrelevant to the interaction;

when the sound is classified as irrelevant to the interaction:

continuing, by the software code executed by the hardware processor, the conversational turn by the first AI character;

when the sound is classified as the interruption:

identifying, by the software code executed by the hardware processor, using the interruption response strategy identification engine and based on a first character persona of the plurality of the character personas corresponding to the first AI character, a response strategy for continuing the interaction; and executing, by the software code executed by the hardware processor, in real-time using word-level time-stamping and streaming playback of speech of the first AI character, the identified response strategy including at least one of: (i) retention, by the first AI character, of the conversational turn, (ii) relinquishment, by the first AI character, of the conversational turn, or (iii) a negotiation, with the at least one of the human or the second AI character, to determine the retention or the relinquishment of the conversational turn by the first AI character.

8. The method of claim 7, wherein when the sound is classified as the interruption, the interruption results in at least one of a change in a prosody of speech by the first AI character, a disfluency in speech by the first AI character, or a hesitation in speech by the first AI character during the conversational turn.

9. The method of claim 7, wherein when the sound is classified as the interruption, the first AI character acknowledges the interruption with at least one of an utterance, a gesture, a facial expression, or gaze avoidance.

10. The method of claim 7, wherein executing the identified response strategy includes retention, by the first AI character, of the conversational turn, and the method further comprises:

modifying, by the software code executed by the hardware processor in response to the interruption, one or more lines of planned speech of the conversational turn.

11. The method of claim 7, wherein the system further comprises a natural language generator (NLG), wherein executing the identified response strategy includes retention, by the first AI character, of the conversational turn, and the method further comprises:

dynamically generating, by the software code executed by the hardware processor and using the NLG in response to the interruption, one or more lines of dialogue for completing the conversational turn by the first AI character.

12. A computer-readable non-transitory medium having stored thereon instructions, which when executed by a hardware processor, instantiate a method comprising:

detecting during a conversational turn by a first artificial intelligence (AI) character in an interaction with at least one of a human or a second AI character, sound produced by the at least one of the human or the second AI character;

classifying using a machine learning (ML) model trained to detect an interruption to a conversation by a participant in the conversation, the sound as one of an interruption by the at least one of the human or the second AI character, or as irrelevant to the interaction;

when the sound is classified as irrelevant to the interaction:

continuing the conversational turn by the first AI character;

when the sound is classified as the interruption:

identifying, using an interruption response strategy identification engine, and based on a character persona corresponding to the first AI character, a response strategy for continuing the interaction; and executing, in real-time using word-level time-stamping and streaming playback of speech of the first AI character, the identified response strategy including at least one of: (i) retention, by the first AI character, of the conversational turn, (ii) relinquishment, by the first AI character, of the conversational turn, or (iii) a negotiation, with the at least one of the human or the second AI character, to determine the retention or the relinquishment of the conversational turn by the first AI character.

13. The computer-readable non-transitory medium of claim 12, wherein when the sound is classified as the interruption, the interruption results in at least one of a change in a prosody of speech by the first AI character, a disfluency in speech by the first AI character, or a hesitation in speech by the first AI character during the conversational turn.

14. The computer-readable non-transitory medium of claim 12, wherein when the sound is classified as the interruption, the interruption is acknowledged by the first AI character with at least one of an utterance, a gesture, a facial expression, or gaze avoidance.

15. The computer-readable non-transitory medium of claim 12, wherein executing the identified response strategy includes retention, by the first AI character, of the conversational turn, and the method further comprises:

modifying, in response to the interruption, one or more lines of planned speech of the conversational turn.

16. The computer-readable non-transitory medium of claim 12, wherein executing the identified response strategy includes retention, by the first AI character, of the conversational turn, and the method further comprises:

dynamically generating, using a natural language generator in response to the interruption, one or more lines of dialogue for completing the conversational turn by the first AI character.

17. The system of claim 1, wherein identifying the response strategy for continuing the interaction is further based on at least one of conversational context data, a conversational turn importance score, or an interruption importance score.

18. The system of claim 4, further comprising a robot embodying the first AI character, the robot including at least one mechanical actuator, and wherein the hardware processor is further configured to execute the software code to:

produce, using the at least on mechanical actuator, the at least one of the utterance, the gesture, the facial expression, or the gaze avoidance by the robot embodying the first AI character.

19. The method of claim 7, wherein identifying the response strategy for continuing the interaction is further based on at least one of conversational context data, a conversational turn importance score, or an interruption importance score.

20. The method of claim 9, wherein the system further comprises a robot embodying the first AI character, the robot including at least one mechanical actuator, and the method further comprising:

producing, by the software code executed by the hardware processor and using the at least one mechanical actuator, the at least one of the utterance, the gesture, the facial expression, or the gaze avoidance by the robot embodying the first AI character.

* * * * *